(12) United States Patent
Shigemitsu (10) Patent No.: US 11,573,170 B2
(45) Date of Patent: *Feb. 7, 2023

(54) DETERMINATION METHOD, ANALYSIS METHOD, AND ANALYSIS SYSTEM

(71) Applicant: ARKRAY, Inc., Kyoto (JP)

(72) Inventor: Takanari Shigemitsu, Kyoto (JP)

(73) Assignee: ARKRAY, INC., Kyoto (JP)

( * ) Notice: Subject to any disclaimer, the term of this patent is extended or adjusted under 35 U.S.C. 154(b) by 22 days.

This patent is subject to a terminal disclaimer.

(21) Appl. No.: 17/170,967

(22) Filed: Feb. 9, 2021

(65) Prior Publication Data

US 2021/0164888 A1 Jun. 3, 2021

Related U.S. Application Data

(63) Continuation of application No. 16/162,829, filed on Oct. 17, 2018, now Pat. No. 10,948,399.

(30) Foreign Application Priority Data

Oct. 23, 2017 (JP) .............................. JP2017-204665

(51) Int. Cl.
*G01N 21/05* (2006.01)
*G01N 27/447* (2006.01)
(Continued)

(52) U.S. Cl.
CPC ............ *G01N 21/05* (2013.01); *B01L 3/5027* (2013.01); *G01N 27/44721* (2013.01);
(Continued)

(58) Field of Classification Search
CPC ............ G01N 21/05; G01N 27/44791; G01N 2021/0346; B01L 3/5027; B01L 2300/0877

See application file for complete search history.

(56) References Cited

U.S. PATENT DOCUMENTS 10,948,399 B2 * 3/2021 Shigemitsu ...... G01N 27/44721
2010/0089771 A1 * 4/2010 Utsunomiya ........ C12Q 1/6869
205/777.5
2010/0175996 A1 7/2010 Tanaka et al.
(Continued)

FOREIGN PATENT DOCUMENTS

EP 2144056 A1 1/2010
EP 2910306 A1 8/2015
(Continued)

OTHER PUBLICATIONS

Office Action issued in corresponding Japanese Patent Application No. 2017-204665 dated Jun. 1, 2021.
(Continued)

*Primary Examiner* — Dominic J Bologna
(74) *Attorney, Agent, or Firm* — Morgan, Lewis & Bockius LLP (57) ABSTRACT

A determination method includes: using a microchip, including a capillary flow path and a sample reservoir connected to the capillary flow path at an upstream side, to fill the capillary flow path with a first solution for electrophoresis, and supply the sample reservoir with a second solution containing an analyte; applying a voltage between the sample reservoir supplied with the second solution and the inside of the capillary flow path filled with the first solution, to move a component contained in the second solution in the capillary flow path and separate the component in the capillary flow path; optically detecting a value related to a component difference between the first solution and the second solution, other than a value related to the analyte, for the separated component; and determining whether the optical detection is favorable or poor by comparing the optically detected value with a predetermined threshold value.

8 Claims, 7 Drawing Sheets

(51) Int. Cl.
 B01L 3/00 (2006.01)
 G01N 21/03 (2006.01)
(52) U.S. Cl.
 CPC ............ *G01N 27/44769* (2013.01); *G01N 27/44791* (2013.01); *B01L 2300/0877* (2013.01); *G01N 2021/0346* (2013.01)

(56) References Cited

U.S. PATENT DOCUMENTS

| | | |
|---|---|---|
| 2011/0134420 A1 | 6/2011 | Matsumoto et al. |
| 2014/0202858 A1 | 7/2014 | Onuma |
| 2015/0233865 A1* | 8/2015 | Onuma ............... B81C 1/00206 |
| | | 204/601 |
| 2016/0069835 A1 | 3/2016 | Onuma |
| 2016/0077053 A1 | 3/2016 | Onuma |

FOREIGN PATENT DOCUMENTS

| | | |
|---|---|---|
| EP | 2993467 A1 | 3/2016 |
| EP | 2998732 A1 | 3/2016 |
| JP | H11-108889 A | 4/1999 |
| JP | 5064497 B2 | 10/2012 |
| JP | 5238028 B2 | 7/2013 |
| JP | 2014-145775 A1 | 8/2014 |
| JP | 2014-160058 A | 9/2014 |

OTHER PUBLICATIONS

Extended European Search Report issued in corresponding European Patent Application No. 18201626.1 dated Mar. 26, 2019.

\* cited by examiner

Stray light 1.6%
HbA1c 10.01%

Fig. 4b

Stray light 18.3%
HbA1c 10.26%

Fig. 4c

Stray light 37%
HbA1c 10.35%

Fig. 4d

Stray light 51%
HbA1c 10.65%

DETERMINATION METHOD, ANALYSIS METHOD, AND ANALYSIS SYSTEM

CROSS-REFERENCE TO RELATED APPLICATION

This application claims priority under 35 USC 119 from Japanese Patent Application No. 2017-204665, the disclosure of which is incorporated by reference herein.

All publications, patent applications, and technical standards mentioned in this specification are herein incorporated by reference to the same extent as if each individual publication, patent application, or technical standard was specifically and individually indicated to be incorporated by reference.

TECHNICAL FIELD

The present application relates to a determination method, an analysis method, and an analysis system.

BACKGROUND ART

In the field of clinical tests, specimen analysis by capillary electrophoresis has conventionally been conducted. In recent years, specimen analysis by electrophoresis using a microchip provided with a capillary flow path has been conducted in order to miniaturize and simplify an apparatus.

For example, an analyzer for analyzing blood proteins such as hemoglobin by capillary electrophoresis has been proposed (see, for example, Patent Document 1). An analysis method for analyzing HbA1c which is a glycated hemoglobin using an electrophoresis chip has also been proposed (see, for example, Patent Document 2).

In capillary electrophoresis, a capillary is irradiated with light, light transmitted through the capillary is detected, and a sample moving in the capillary is analyzed. When analyzing a sample using such an optical method, in order to improve the analysis accuracy, it is necessary to remove internal stray light (extra light not contributing to measurement) due to aberration, irregular reflection, or the like of lenses constituting an optical system. Therefore, for the purpose of improving the analysis accuracy, a microchip having a function of reducing the influence of stray light has been proposed (see, for example, Patent Document 3).

RELATED ART DOCUMENTS

Patent Documents

Patent Document 1 Japanese Patent Application Laid-Open (JP-A) No. 2014-145775
Patent Document 2 Japanese Patent No. 5064497
Patent Document 3 Japanese Patent No. 5238028

SUMMARY

When the analyzer described in Patent Document 1 is used, there is a problem that while the analysis accuracy of blood protein is excellent, the device is large, operation is complicated, and high cost is incurred.

In the analysis method described in Patent Document 2, glycated hemoglobin can be measured using a rapid and inexpensive microchip. However, when stray light in optical detection exerts a large influence on the measurement accuracy, and a function of removing stray light is provided in an analyzer, the configuration of the analyzer becomes complicated and expensive.

Although the microchip described in Patent Document 3 has a function of reducing the influence of stray light, which enables analysis at a low cost with a simple device, in some cases, an influence of stray light is not reduced due to an optical trouble of analyzer, a production defect such as a scratch in a mechanism for removing stray light of a microchip, or foreign matter contamination in a mechanism for removing stray light of a microchip.

An object of one aspect of the present application is to provide a determination method, an analysis method, and an analysis system that can achieve high measurement accuracy easily and inexpensively.

Means for Solving the Problems

<1> A determination method for determining whether the state of optical detection of a microchip is favorable or poor, comprising:

a supply process in which, by using the microchip including a capillary flow path and a sample reservoir connected to the capillary flow path at an upstream side, the capillary flow path is filled with a first solution for electrophoresis, and the sample reservoir is supplied with a second solution containing an analyte in a sample;

a separation process in which, by applying a voltage between the sample reservoir supplied with the second solution and an inside of the capillary flow path filled with the first solution, a component contained in the second solution moves in the capillary flow path and the component is separated in the capillary flow path;

a detection process for optically detecting a value related to a component difference between the first solution and the second solution, other than a value related to the analyte, for the separated component; and a determination process for determining whether the state of the optical detection is favorable or poor by comparing the optically detected value related to the component difference with a predetermined threshold value.

<2> The determination method according to <1>, wherein:

at least one of the first solution or the second solution contains a specific substance, and the component difference between the first solution and the second solution is a difference in concentration of the specific substance between the first solution and the second solution.

<3> The determination method according to <2>, wherein the specific substance is an electrically neutral substance.

<4> The determination method according to <2> or <3>, wherein the specific substance is at least one of 1-(3-sulfopropyl) pyridinium hydroxide inner salt or polyoxyalkylene alkyl ether.

<5> The determination method according to any one of <1> to <4>, wherein a shear flow is generated at a connecting portion between the capillary flow path and the sample reservoir in the supply process.

<6> An analysis method, comprising each process of the determination method according to any one of <1> to <5>, wherein, in the detection process, with respect to the separated component, a value related to the analyte is optically detected together with the value related to the component difference between the first solution and the second solution other than the value related to the analyte.

<7> The analysis method according to <6>, wherein the analyte is a biologically derived substance.

<8> The analysis method according to <6> or <7>, wherein the microchip is not reused.

<9> An analysis system for determining whether the state of optical detection of a microchip is favorable or poor, comprising:

an arrangement unit to which the microchip, including a capillary flow path and a sample reservoir connected to the capillary flow path at an upstream side, is fitted;

separation means in which, in the microchip which is fitted to the arrangement unit and in which the capillary flow path is filled with a first solution for electrophoresis, and the sample reservoir is supplied with a second solution containing an analyte in a sample, by applying a voltage between the sample reservoir supplied with the second solution and an inside of the capillary flow path filled with the first solution, a component contained in the second solution moves in the capillary flow path and the component is separated in the capillary flow path;

detection means for optically detecting a value related to a component difference between the first solution and the second solution for the separated component; and determination means for determining whether the state of the optical detection is favorable or poor by comparing, among values detected by the detection means, a value related to the component difference, other than a value related to the analyte, with a predetermined threshold value.

According to one aspect of the application, a determination method, an analysis method, and an analysis system that can achieve high measurement accuracy easily and inexpensively can be provided.

BRIEF DESCRIPTION OF THE DRAWINGS

FIG. 1 is a schematic configuration diagram of a microchip used in a determination method, an analysis method, and an analysis system of one aspect of the application, and FIG. 1, part a is a top view, and FIG. 1, part b is a sectional view taken along line C'-C' of FIG. 1, part a.

MODE FOR CARRYING OUT THE APPLICATION

Hereinafter, a determination method, an analysis method, and an analysis system of one aspect of the application will be described.

Herein, the numerical range expressed by using "to" means a range including numerical values described before and after "to" as a lower limit value and an upper limit value.

[Determination Method]

A determination method according to one aspect of the application includes: a supply process in which, by using a microchip including a capillary flow path and a sample reservoir connected to the capillary flow path at an upstream side, the capillary flow path is filled with a first solution for electrophoresis, and the sample reservoir is supplied with a second solution containing an analyte; a separation process in which, by applying a voltage between the sample reservoir supplied with the second solution and an inside of the capillary flow path filled with the first solution, a component contained in the second solution moves in the capillary flow path and the component is separated in the capillary flow path; a detection process for optically detecting a value related to a component difference between the first solution and the second solution (an optical value related to component difference) other than a value related to the analyte (an optical value related to the analyte) for the separated component; and a determination process for determining whether the state of the optical detection is favorable or poor by comparing the optically detected value related to the component difference with a predetermined threshold value.

In the determination method of the aspect, a value related to a component difference between the first solution and the second solution other than a value related to an analyte is optically detected for the component separated in the capillary flow path by electrophoresis. Then, by comparing the optically detected value related to the component difference with a predetermined threshold value, whether the state of optical detection is favorable or poor is determined. As a result, it is possible to determine whether the state of optical detection of a microchip is favorable or poor, and it is possible to easily and inexpensively achieve high measurement accuracy even when a microchip including a capillary flow path is used.

For example, when a value for optically detected component difference is an absorbance or an absorbance change amount derived from a difference in concentration of a specific substance (excluding an analyte such as a biologically derived substance) contained in at least one of the first solution or the second solution, in determination means, the above-described absorbance or absorbance change amount may be compared with a predetermined threshold value to determine whether the state of optical detection is favorable or poor.

For example, the numerical values of an absorbance and absorbance change amount derived from a difference in concentration of a specific substance (excluding an analyte such as a biologically derived substance) contained in at least one of the first solution or the second solution tend to decrease as the stray light ratio increases, or the state of optical detection deteriorates. Even when optical detection is performed using a plurality of microchips using the first solution and the second solution having the same composition, results of the absorbance and absorbance change amount described above vary depending on the states of the microchips, for example, a production defect such as a scratch in a mechanism for removing stray light of a microchip, or a foreign matter contamination in a mechanism for removing stray light of a microchip. Accordingly, an absorbance or an absorbance change amount corresponding to an allowable stray light ratio is set as a threshold value, and a value equal to or larger than the threshold value may be determined that the state of optical detection is favorable, and a value less than the threshold value may be determined that the state of optical detection is poor.

In the determination method of the aspect, a value related to the component difference between the first solution and the second solution other than a value related to an analyte is optically detected, and whether the state of the optical detection is favorable or poor is determined by using a value related to such component difference.

Here, rather than determining whether the state of optical detection is favorable or poor by using a value related to an analyte, it is preferable to determine whether the state of optical detection is favorable or poor by using a value related to the component difference between the first solution and the second solution other than a value related to an analyte.

In the former case, when the concentration of a sample including an analyte is unknown and when a value related to the analyte such as the absorbance or absorbance change amount described above is different from a predetermined threshold value, it is impossible to determine whether the difference is due to the influence of stray light or due to the influence of the concentration of the sample including the analyte.

On the other hand, in the latter case, it is possible to determine whether the state of optical detection is favorable or poor by a single operation by comparing a value related to the obtained component difference with a predetermined threshold value, regardless of the concentration of a sample including an analyte.

A microchip used in the determination method of the aspect is used for a variety of analysis methods for a variety of samples, and is preferably used for analysis of substances (preferably biologically derived substances) in a sample by electrophoresis (preferably capillary electrophoresis). Examples of samples include a specimen derived from a living organism, a specimen derived from the environment, a metal, a chemical substance, and a pharmaceutical. The specimen derived from a living organism is not particularly limited, and examples thereof include urine, blood, hair, saliva, sweat, and nail. Examples of the blood specimen include a red blood cell, whole blood, serum, and plasma. Examples of the living body include a human, a non-human animal, and a plant, and examples of the non-human animal include a mammal other than humans, an amphibian reptile, a fish, a shellfish, and an insect. The specimen derived from the environment is not particularly limited, and examples thereof include food, water, soil, atmosphere, and air. Examples of the food include a fresh food, and a processed food. Examples of the water include drinking water, groundwater, river water, sea water, and domestic wastewater. The sample is preferably blood collected from a human body or the like. As the analyte, a biologically derived substance contained in a sample is preferable, and the biologically derived substance contained in blood is more preferable. Hemoglobin is also preferable among biological substances.

A diluted solution prepared, for example, by suspending, dispersing, or dissolving a solid including an analyte and a liquid containing an analyte (stock solution) in a liquid medium may be used as a sample. Examples of the liquid medium include water, and a buffer solution.

Examples of an analyte included in blood include hemoglobin (Hb), albumin (Alb), globulin ($\alpha 1$, $\alpha 2$, $\beta$, $\gamma$ globulin), and fibrinogen. Examples of hemoglobin include normal hemoglobin (HbA0), glycated hemoglobin, modified hemoglobin, fetal hemoglobin (HbF), and mutated hemoglobin. Examples of glycated hemoglobin include hemoglobin A1a (HbA1a), hemoglobin A1b (HbA1b), hemoglobin A1c (HbA1c), and GHbLys. Examples of hemoglobin A1c include stable HbA1c (S-HbA1c), and unstable HbA1c (L-HbA1c). Examples of modified hemoglobin include carbamylated Hb, and acetylated Hb. Examples of the mutated hemoglobin include hemoglobin C (HbC), hemoglobin D (HbD), hemoglobin E (HbE), and hemoglobin S (HbS).

In the determination method of the aspect, at least one of the first solution or the second solution contains a specific substance, and the component difference between the first solution and the second solution is preferably the difference in concentration of a specific substance between the first solution and the second solution. The first solution and the second solution preferably contain a specific substance, and more preferably, the second solution contains a specific substance.

When a specific substance is contained only in the first solution or a specific substance is contained only in the second solution, there is a difference in concentration of a specific substance between the first solution and the second solution.

From the viewpoint of suppressing adverse effects on the electrophoresis of the first solution and the second solution, the specific substance is preferably an electrically neutral substance. Examples of the electrically neutral substance include a substance that is partially charged and is neutral as a whole, and a substance that does not have partial charges and is neutral, and specific examples thereof include an amphoteric substance and a nonionic substance. The specific substance may be used singly or two or more kinds thereof may be used. When two or more kinds of the specific substances are used, all the specific substances may be contained in the first solution and the second solution, respectively, or at least one of the specific substances may be contained in only one of the first solution and the second solution.

Examples of the amphoteric substance include phosphobetaine, sulfobetaine, and carbobetaine. More specifically, 1-(3-sulfopropyl) pyridinium hydroxide inner salt is preferable.

Examples of the nonionic substance include a sugar such as glucose or starch, urea, an alcohol such as polyethylene glycol, a nonionic surfactant, and a nonionic polymer. As the nonionic substance, polyoxyalkylene alkyl ether is preferable.

The second solution preferably contains an electrically neutral substance. As a result, an electrically neutral substance contained in the second solution is subjected to an electroosmotic flow, electrophoreses at the interface between the first solution and the second solution in the capillary flow path 2, whereby whether the state of optical detection is favorable or poor is determined without being affected by measurement of an analyte.

Figure 1:
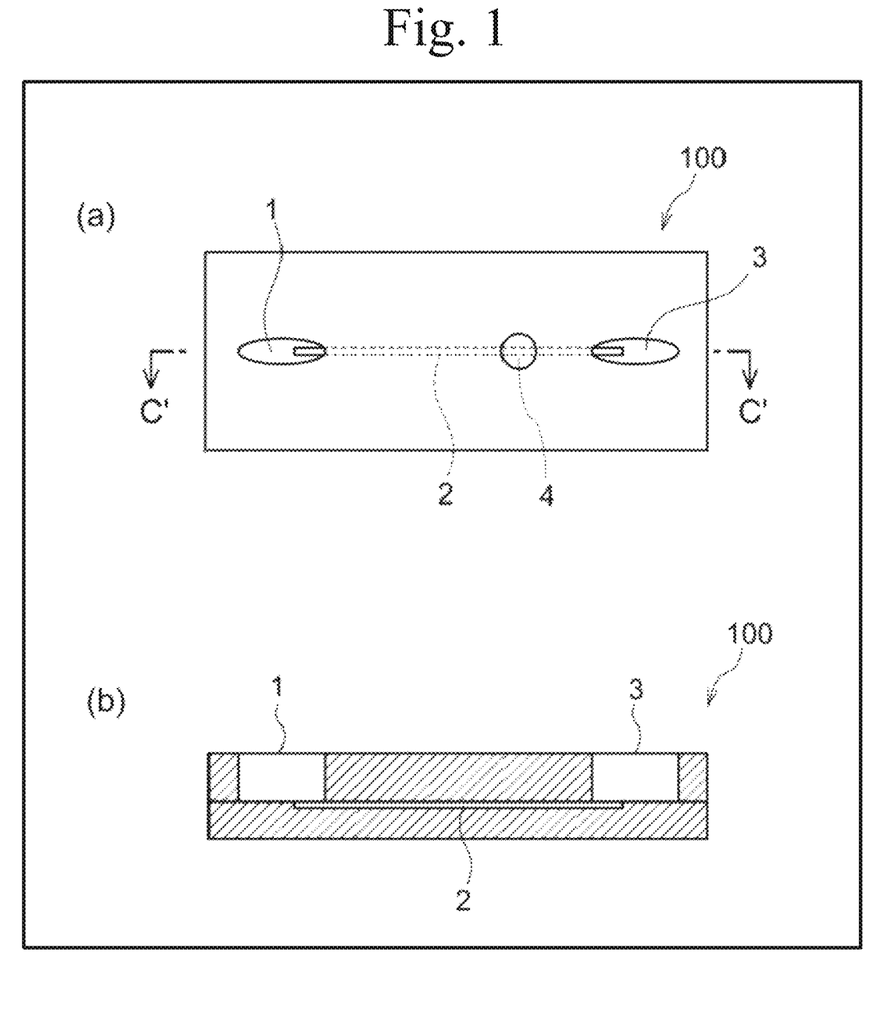

The microchip used in the determination method of the aspect will be described with reference to FIG. 1. FIG. 1 is a schematic configuration diagram of a microchip used in a determination method and an analysis method of one aspect of the application, and FIG. 1, part (a) is a top view, and FIG. 1, part (b) is a sectional view taken along line C'-C' of FIG. 1, part (a). As shown in FIG. 1, a microchip 100 includes a sample reservoir 1, an electrophoresis liquid reservoir 3, a capillary flow path 2, and a detector 4. The microchip 100 may be manufactured, for example, by joining a pair of base materials, which are substantially rectangular plate-shaped members. More specifically, the microchip 100 may be manufactured by joining a base material having through holes corresponding to the sample reservoir 1 and the electrophoresis liquid reservoir 3 and a base material including a fine groove corresponding to the capillary flow path 2 in such a manner that both ends of the groove face portions of the two through holes respectively.

Examples of the material of the base material constituting the microchip include glass, fused silica, and a resin, and from the viewpoints of cost, ease of processing, and ease of immobilization of a cationic polymer, a resin is preferable. Examples of the resin include an acrylic resin such as polymethyl methacrylate (PMMA), polymethyl methacrylate, polycarbonate, polyvinylidene chloride, cyclic polyolefin, polyether ether ketone, polystyrene, polytetrafluoroethylene (PTFE), cycloolefin, polypropylene, and polyethylene, and from the viewpoint of excellent light transmittance, methyl polymethacrylate is preferable.

As the microchip used in the determination method of the aspect and the analysis method of the aspect described below, a disposable type analysis chip not reusing may be used.

The sample reservoir 1 is a tank that is supplied with a second solution containing an analyte such as a biologically derived substance from an opening and stores the supplied second solution. The sample reservoir 1 is connected to the end of the capillary flow path 2.

The main agent of a diluent is not particularly limited, and examples thereof include water, and physiological saline, and a substance which can be contained in the first solution for electrophoresis described below as a preferred example may be added to the diluent. For example, the diluent may be one obtained by adding a compound including a cathodic group to the main agent. Examples of the compound including a cathodic group include a cathodic group-containing polysaccharide, and more specific examples thereof include a sulfated polysaccharide, a carboxylated polysaccharide, a sulfonated polysaccharide, and a phosphorylated polysaccharide. As the carboxylated polysaccharide, alginic acid and a salt thereof (for example, sodium alginate) is preferable. As the sulfated polysaccharide, for example, chondroitin sulfate is preferable. There are seven kinds of chondroitin sulfuric acid, A, B, C, D, E, H, and K, and any of them may be used. The concentration of a compound including a cathodic group (chondroitin sulfate) is preferably, for example, in the range of from 0.01% by mass to 5% by mass.

The electrophoresis liquid reservoir 3 is a reservoir for supplying a first solution for electrophoresis from an opening and storing the supplied first solution. The electrophoresis liquid reservoir 3 is connected to an end of the capillary flow path 2, and the first solution is filled in the capillary flow path 2 by pressurization.

The first solution which is an electrophoresis liquid used for electrophoresis is a medium which is supplied from the opening to the electrophoresis liquid reservoir 3 and filled in the capillary flow path 2 to generate electroosmotic flow in electrophoresis. The first solution includes water, physiological saline and the like. The first solution preferably contains an acid. Examples of the acid include citric acid, maleic acid, tartaric acid, succinic acid, fumaric acid, phthalic acid, malonic acid, and malic acid. The first solution preferably contains a weak base. Examples of the weak base include arginine, lysine, histidine, and a tris. The pH of the first solution is preferably, for example, in the range of pH from 4.5 to 6. Examples of the buffer of the first solution include MES, ADA, ACES, BES, MOPS, TES, and HEPES. The compound including a cathodic group described in the description of the diluent may also be added to the first solution. The concentration of the compound including a cathodic group (chondroitin sulfate or the like) is preferably, for example, in the range of from 0.01% by mass to 5% by mass.

The capillary flow path 2 is connected to the sample reservoir 1 and the electrophoresis liquid reservoir 3, and is a flow path for analyzing an analyte in the second solution supplied to the sample reservoir 1, and is preferably a capillary tube for analyzing an analyte by electrophoresis.

The size of the capillary flow path 2 is not particularly limited, and preferably, for example, the depth is from 25 µm to 100 µm, the width is from 25 µm to 100 µm, and the length is from 5 mm to 150 mm.

From the viewpoint of enhancing the analytical performance, the capillary flow path 2 may be provided with an electric charge, for example, a positive electric charge on a wall face. The method of imparting a positive charge is not particularly limited, and a cationic polymer may be immobilized in a region corresponding to the capillary flow path 2 in the above-described pair of base materials before joining the pair of base materials described above.

The detector 4 is for entering and emitting light to be analyzed when conducting analysis by electrophoresis on the microchip 100, and is used, for example, for measuring absorbance. The detector 4 is formed at a position facing at least a portion of the capillary flow path 2. The position of the detector 4 may be appropriately determined according to the length of the capillary flow path 2 and the like.

(Supply Process)

Hereinafter, each process of the determination method of the aspect using the above-described microchip 100 will be described. The determination method of the aspect includes a supply process in which, by using the microchip 100 described above, the capillary flow path 2 is filled with the first solution and the sample reservoir 1 is supplied with the second solution containing an analyte. For example, the first solution stored in the electrophoresis liquid reservoir 3 may be pressurized to fill the capillary flow path 2 with the first solution, and as the second solution, one obtained by diluting a sample containing an analyte with the aforementioned diluent may be used.

(Separation Process)

Next, the determination method of the aspect includes a separation process in which, by applying a voltage between the sample reservoir 1 supplied with the second solution and an inside of the capillary flow path 2 filled with the first solution, a component contained in the second solution moves in the capillary flow path 2 and the aforementioned component is separated in the capillary flow path 2.

In the microchip 100, the electrophoresis liquid reservoir 3 is supplied with the first solution, the capillary flow path 2 is filled with the first solution by pressurization, and the sample reservoir 1 is supplied with the second solution, and then, an anode is brought into contact with the sample reservoir 1, a cathode is brought into contact with the electrophoresis liquid reservoir 3, and a voltage is applied therebetween. As a result, electroosmotic flow occurs in the capillary flow path 2, the second solution is introduced from the sample reservoir 1 into the capillary flow path 2, and when the second solution moves from the sample reservoir 1 toward the electrophoresis liquid reservoir 3, the component in the second solution is separated. The applied voltage is preferably, for example, from 0.5 kV to 20 kV, more preferably from 0.5 kV to 10 kV, and still more preferably from 0.5 kV to 5 kV.

(Detection Process)

The determination method of the aspect includes a detection process in which, for the aforementioned separated component, a value related to the component difference between the first solution and the second solution other than a value related to an analyte is optically detected. The component separated in the capillary flow path 2 is measured by an optical method such as absorbance measurement. For example, the absorbance may be measured by irradiating light from the detector 4. The absorbance represents the absolute value of the common logarithm value of the ratio of the intensity of incident light to the intensity of transmitted light, and for example, an optical measurement value such as a value of the intensity of transmitted light itself which is simply detected without calculating the absorbance can be used for the determination method of the aspect. In the following, explanation will be made taking as an example a case of calculating the absorbance. At this time, for the separated component, the absorbance derived from the component difference between the first solution and the second solution other than the absorbance derived from an analyte is measured, and the absorbance derived from the component difference or the absorbance change amount obtained by using the component difference may be obtained. The separated component may substantially not absorb light irradiated from the detector 4, and for example, a change in apparent absorbance or absorbance change amount caused by a change in the intensity of transmitted light due to scattering, refraction, or the like caused by a difference in concentration of a specific substance may be detected.

(Determination Process)

The determination method according to the aspect includes a determination process in which whether the state of optical detection is favorable or poor is determined by comparing a value related to the optically detected component difference with a predetermined threshold. The state of optical detection may be determined by comparing the absorbance or absorbance change amount derived from the component difference obtained in the detection process with a predetermined threshold value. For example, an absorbance or an absorbance change amount corresponding to an allowable stray light ratio is set as a threshold value, and a value equal to or larger than the threshold value may be determined that the state of optical detection is favorable, and a value less than the threshold value may be determined that the state of optical detection is poor. The determined state of optical detection may be displayed by display means such as a monitor (not shown), or may be notified by alarm means such as an alarm. Such display, notification, or the like is preferably performed only when it is determined that the state of optical detection is poor. When it is determined that the state of optical detection is favorable, it is preferable that such display, notification, or the like is not performed. When it is determined that the state of optical detection is poor, there is a conceivable influence of stray light or the like due to an optical trouble of analyzer, a production defect such as a scratch in a mechanism for removing stray light of a microchip, or foreign matter contamination in a mechanism for removing stray light of a microchip, and therefore, it is preferable to stop measurement of an analyte by the microchip. Besides, when it is determined that the state of optical detection is poor, the optically detected value related to the analyte may be corrected based on the value related to the above-described optically detected component difference (a correction process). For example, the absorbance or absorbance change amount derived from the aforementioned component difference obtained in the detection process is compared with the absorbance or absorbance change amount corresponding to a predetermined specific stray light ratio, and the absorbance or absorbance change amount derived from an analyte obtained in the detection process may be corrected according to the result of the comparison. By correcting a value related to an analyte, for example, the absorbance or absorbance change amount derived from the analyte, the measurement accuracy of the analyte can be enhanced.

[Analysis Method]

The analysis method of the aspect includes each process in the above-described determination method, and in the detection process, with respect to a separated component, a value related to an analyte is optically detected together with a value related to the component difference between the first solution and the second solution other than value related to the analyte. For example, in the analysis method of the aspect, it is determined whether the state of optical detection is favorable or poor in the determination process and a value related to an analyte is optically detected in the detection process, that is, the absorbance or absorbance change amount which is an example of an optical measurement value or an optical measurement value change amount derived from an analyte is obtained.

When the analyte contained in the second solution is hemoglobin, for example, it is preferable to measure the absorbance at a wavelength of 415 nm. The component ratio or the like in the second solution may be obtained by calculating the peak height, the area of the peak, or the like of the electropherogram obtained by measuring the absorbance.

[Kit]

The microchip used in the aspect may be a kit in combination with a cartridge for storing a solution for analysis. The kit may include, for example, a microchip used in the aspect and cartridges storing a diluent and a first solution, respectively.

[Analysis System]

An analysis system according to the aspect includes: an arrangement unit to which a microchip including a capillary flow path and a sample reservoir connected to the capillary flow path at an upstream side is fitted; separation means in which, in the microchip which is fitted to the arrangement unit and in which the capillary flow path is filled with a first solution for electrophoresis, and the sample reservoir is supplied with a second solution containing an analyte, by applying a voltage between the sample reservoir supplied with the second solution and an inside of the capillary flow path filled with the first solution, a component contained in the second solution moves in the capillary flow path and the component is separated in the capillary flow path; detection means for optically detecting a value related to the component difference between the first solution and the second solution for the separated component; and determination means for determining whether the state of the optical detection is favorable or poor by comparing, among values detected by the detection means, a value related to the component difference, other than a value related to the analyte, with a predetermined threshold value. With this analysis system, it is possible to determine whether the state of optical detection of the microchip is favorable or poor, and it is possible to easily and inexpensively achieve high measurement accuracy even when a microchip including a capillary flow path is used.

The analysis system of the aspect includes an arrangement unit to which the microchip described above is fitted. The microchip fitted to the arrangement unit includes, for example, a sample reservoir, an electrophoresis liquid reservoir, a capillary flow path connected to the sample reservoir and the electrophoresis liquid reservoir, and the like. The electrophoresis liquid reservoir is supplied with a first solution for electrophoresis, and the capillary flow path is filled with the first solution by pressurization. The sample reservoir is supplied with a second solution (for example, a solution obtained by diluting a sample containing an analyte) including an analyte, and by applying a voltage to the sample reservoir supplied with the second solution and an inside of the capillary flow path filled with the first solution, a component contained in the second solution moves in the capillary flow path, whereby the aforementioned component is separated in the capillary flow path.

The analysis system of the aspect includes separation means for separating a component contained in the second solution in the capillary flow path by applying a voltage between the sample reservoir supplied with the second solution and an inside of the capillary flow path filled with the first solution. The separation means applies a predetermined voltage to an inside of the capillary flow path, and examples thereof include an anode to be inserted into the sample reservoir, a cathode to be inserted into the electrophoresis liquid reservoir, and voltage application means for applying a voltage to the anode and the cathode.

The analysis system of the aspect includes detection means in which, for the aforementioned separated component, a value related to the component difference between the first solution and the second solution, preferably the difference in concentration of a specific substance between the first solution and the second solution, is optically detected. Examples of the detection means include a light emitting unit and a measurement unit.

For example, the light emitting unit emits light for measuring the absorbance and is a unit that irradiates the detector of a microchip with light. The light emitting unit includes, for example, an LED chip that emits light in a predetermined wavelength range, an optical filter, a lens, and the like. The light emitting unit may have a slit.

For example, the measurement unit is a portion that receives light irradiated to the detector of the microchip and measures the absorbance. The measurement unit includes, for example, a photodiode, a photo IC, and the like.

The analysis system of the aspect includes determination means for determining whether the state of optical detection is favorable or poor by comparing, among values related to component difference detected by the detection means, a value related to component difference, other than a value related to an analyte, with a predetermined threshold value. For example, when the value related to component difference detected by the detection means is the absorbance or absorbance change amount derived from a difference in concentration of a specific substance (excluding an analyte such as a biologically derived substance) contained in at least one of the first solution or the second solution, the determination means may determine whether the state of optical detection is favorable or poor by comparing the aforementioned absorbance or absorbance change amount with a predetermined threshold value. Specifically, an absorbance or an absorbance change amount corresponding to an allowable stray light ratio is set as a threshold value, and a value equal to or larger than the threshold value may be determined that the state of optical detection is favorable, and a value less than the threshold value may be determined that the state of optical detection is poor. The analysis system of the aspect may include display means such as a monitor for displaying a determined state of optical detection or may include notification means such as an alarm for notifying a determined state of optical detection. It is preferable that the display means and the notification means respectively display and notify only when the state of optical detection is determined to be poor, and it is preferable not to display and notify each when the state of optical detection is determined to be favorable. When the state of optical detection is determined to be poor, the determination means preferably stops the measurement of an analyte by a microchip. Besides, the determination means may include correction means in which, when it is determined that the state of optical detection is poor, the optically detected value related to the analyte is corrected based on the value related to the optically detected component difference other than value related to the analyte. For example, in the determination means, the absorbance or absorbance change amount derived from the aforementioned difference in concentration detected in the detection means is compared with the absorbance or absorbance change amount corresponding to a predetermined specific stray light ratio, and the absorbance or absorbance change amount derived from an analyte detected in the detection means may be corrected according to the result of the comparison.

Further, the analysis system of the aspect may include a diluent tank, an electrophoresis liquid tank, a pump, a control unit, and the like.

The diluent tank is, for example, a tank for storing a diluent for diluting a sample containing an analyte. For example, after mixing a diluent supplied from the diluent tank and a sample containing an analyte in a mixing tank, a solution (second solution) obtained by diluting the sample including the analyte may be supplied to the sample reservoir. In this case, a microchip used in the analysis system of the aspect may include a mixing tank for mixing the diluent supplied from the diluent tank and the sample containing the analyte.

The electrophoresis liquid tank is, for example, a tank for storing a first solution for electrophoresis supplied to the electrophoresis liquid reservoir.

The pump is, for example, a portion for supplying a diluent to a mixing tank by pressure application, supplying a first solution to an electrophoresis liquid reservoir by pressure application, and filling the first solution into a capillary flow path. A solution (second solution) obtained by diluting a sample containing an analyte in a mixing tank may be supplied to a sample reservoir by a pump. The second solution supplied to the sample reservoir may be made to flow by performing at least one of discharge and suction using a pump once or by repeating discharge and suction using a pump.

Figure 2:
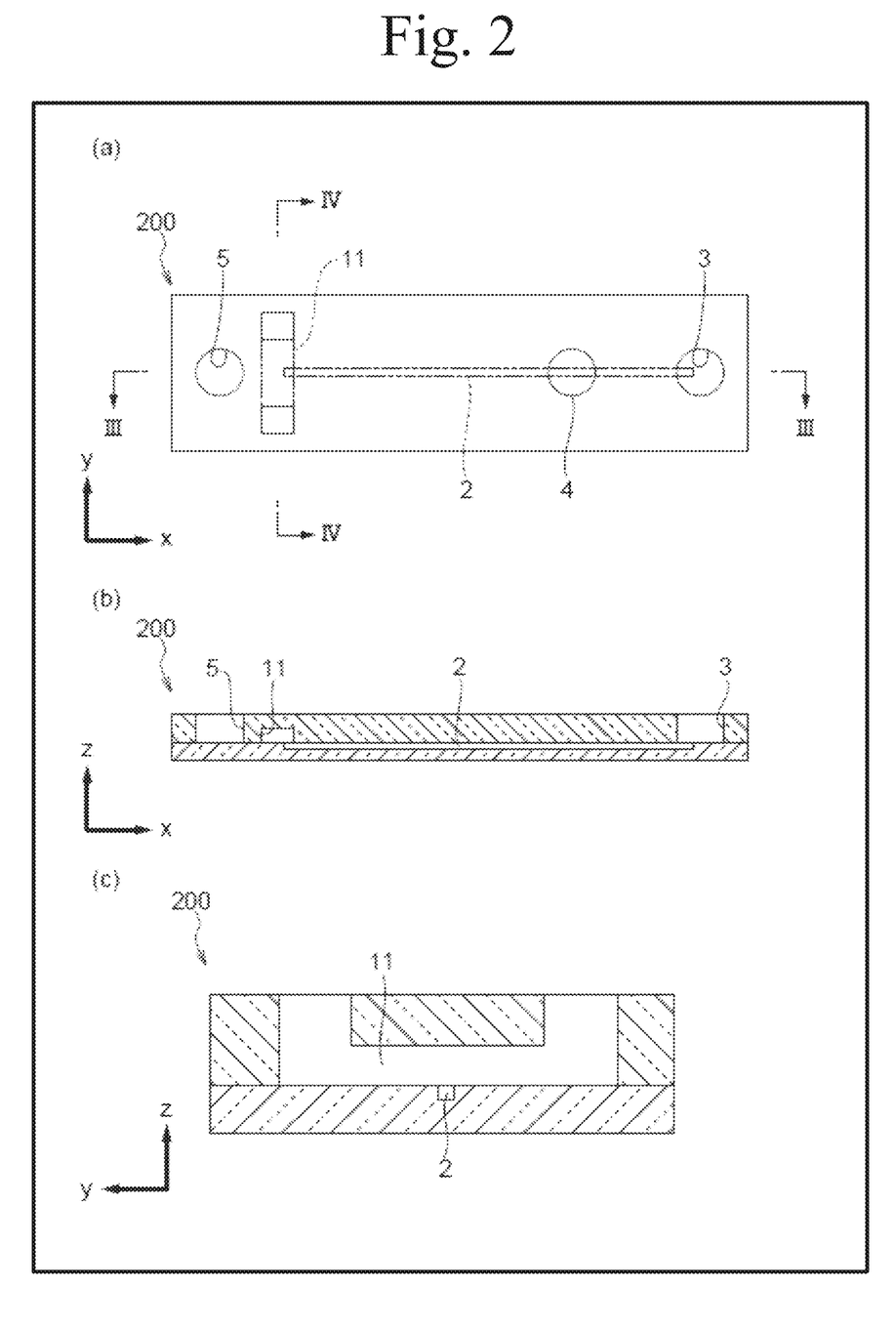
FIG. 2 is a schematic configuration diagram of a microchip used in the analysis system of one aspect of the application, and FIG. 2, part (a) is a top view, and FIG. 2, part (b) is a sectional view taken along the line III-III in FIG. 2, part (a), and FIG. 2, part (c) is a sectional view taken along line IV-IV of FIG. 2, part (a).

FIG. 2 shows a microchip provided with a mixing tank and having a structure capable of allowing a second solution stored in a sample reservoir to flow. The microchip 200 shown in FIG. 2 includes a mixing tank 5 for mixing a diluent with a sample containing an analyte and a sample reservoir 11 including two openings and capable of allowing the second solution to flow. When allowing the second solution stored in the sample reservoir 11 to flow, for example, at least one of discharge and suction using a pump may be performed once to cause the second solution stored in the sample reservoir 11 to flow, and alternatively, by repeatedly performing discharge and suction using a pump, the second solution stored in the sample reservoir 11 may be reciprocated in the y direction in FIG. 2. At this time, in the vicinity of a connecting portion between the sample reservoir 11 and the capillary flow path 2, a shear flow occurs because the first solution in the capillary flow path 2 hardly moves. As a result, a shear flow that generates a clear boundary between the first solution filled in the capillary flow path 2 and the second solution stored in the sample reservoir 11 is generated and the analysis accuracy tends to be improved.

Example of a method of generating a shear flow at a connecting portion between the capillary flow path and the sample reservoir include a method in which the first solution is filled in the capillary flow path and the second solution is stored in the sample reservoir 11 in a state where a wall is provided in the connecting portion described above and then the wall is removed.

In the case of allowing the second solution stored in the sample reservoir 11 to flow by repeating discharge and suction using the pump, it is preferable that, after the pump is strongly idled, the pump is connected to the sample reservoir 11 of the microchip 200 to flow the second solution stored in the sample reservoir 11. This makes it easier for the pressure during pump operation to be stabilized.

A control unit controls each of the above-described components in the analysis system, and includes, for example, a CPU, a memory, an interface, and the like. The control unit may also serve as a determination unit for determining whether optical detection is favorable or poor.

Figure 3:
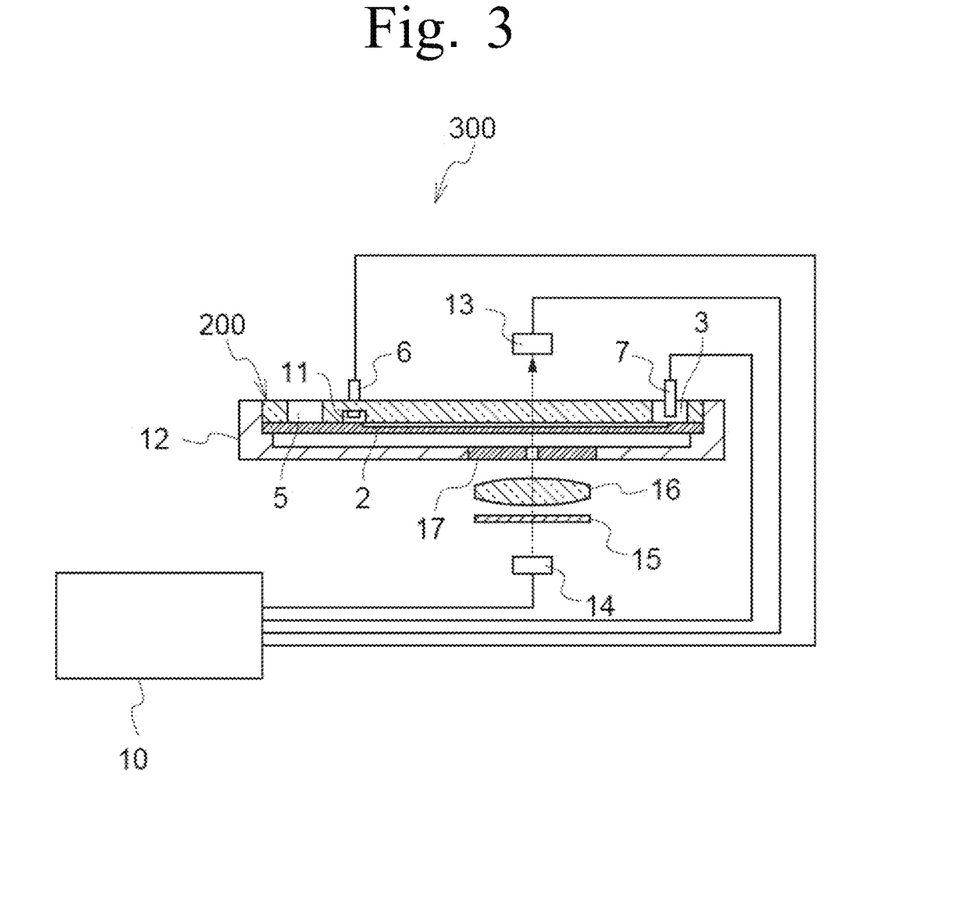
FIG. 3 is a sectional view showing a schematic configuration of an analysis system of one aspect of the application.

The analysis system of the aspect will be described with reference to FIG. 3. FIG. 3 is a sectional view showing a schematic configuration of an analysis system of one aspect of the application. An analysis system 300 shown in FIG. 3 includes an arrangement unit 12 to which the microchip 200 is fixed, an anode 6, a cathode 7, a control unit 10, a photodiode 13, an LED chip 14, an optical filter 15, a lens 16, and a slit 17.

The anode 6 is inserted into the sample reservoir 11, and the cathode 7 is inserted into the electrophoresis liquid reservoir 12. The LED chip 14 irradiates a detector of the microchip 200 with light, and the photodiode 13 receives the light irradiated to the detector of the microchip 200, and measures the absorbance.

The control unit 10 controls each component in the analysis system 300, and for example, the control unit 10 may perform control of a voltage applied to the anode 6 and the cathode 7, control of light emitted from the LED chip 14, measurement of absorbance based on light received by the photodiode 13, quality determination of optical detection, and the like. The control unit 10 may perform control of each configuration not described in FIG. 3 such as control of pump discharge and suction, or control of supply, flow, and the like of the diluent, the first solution, the second solution, and the like.

Although the determination method, analysis method, and analysis system according to one aspect of the application have been described above, the application is not limited to these aspects and various improvements, changes, and modifications may be made based on knowledge of those skilled in the art without departing from the spirit of the application. The items described in the items of the determination method, analysis method, and analysis system according to one aspect of the application may be combined as appropriate.

EXAMPLES

Next, one aspect of the application will be described based on the following Examples, but the application is not limited to the following Examples.
<Preparation of Microchip>
In this Example, a resin-made microchip having each configuration satisfying the following conditions was prepared. The inner wall of a capillary flow path is covered with polydiallyldimethylammonium chloride (weight average molecular weight of from 100,000 to 500,000).

Sample reservoir • • • Capacity 10 μL

Electrophoresis liquid reservoir • • • Capacity 10 μL

Capillary flow path • • • Depth 0.04 mm×width 0.04 mm×length 30 mm (Optical detection is performed by a detector that is 20 mm away from the side of the sample reservoir)
<Preparation of Electrophoresis Liquid>
First, each substance was added to distilled water to prepare the following electrophoresis liquid (1) and electrophoresis liquid (2).

(Electrophoresis Liquid (1))
40 mM citric acid, 1.25% w/v chondroitin sulfate C sodium, 20 mM piperazine, 0.1% w/v polyoxyalkylene alkyl ether (trade name: EMULGEN LS-110, manufactured by Kao Corporation), 0.02% w/v sodium azide, 0.025% w/v proclin 300, dimethylaminoethanol (for pH adjustment), pH 5.0

(Electrophoresis Liquid (2))
38 mM citric acid, 0.95% w/v chondroitin sulfate C sodium, 475 mM 1-(3-sulfopropyl) pyridinium hydroxide inner salt (NDSB-201), 19 mM morpholinoethanesulfonic acid (MES), 0.4% w/v polyoxyalkylene alkyl ether (trade name: EMULGEN LS-110, manufactured by Kao Corporation), 0.02% w/v sodium azide, 0.025% w/v proclin 300, dimethylaminoethanol (for pH adjustment), pH 6.0
<Preparation of Sample>
ADAMS A1c Control Level 2 (manufactured by ARKRAY, Inc.) was dissolved in 300 μL of purified water to prepare a sample.
<Conduct of Capillary Electrophoresis>
Analysis of hemoglobin in the sample was conducted according to the following procedure. Capillary electrophoresis was carried out using four microchips.

1) A microchip was set in a dedicated device manufactured by ARKRAY, Inc.

2) The following electrophoresis liquid (1) was added to the electrophoresis liquid tank (electrophoresis liquid reservoir) of the microchip, and the electrophoresis liquid (1) was filled in the capillary flow path by pressurization.

3) 1.5 μL of the sample was added to 60 μL of electrophoresis liquid (2) to obtain a diluted sample.

4) The diluted sample was added to a sample tank (sample reservoir).

5) An anode was brought into contact with the sample reservoir and a cathode was brought into contact with the electrophoresis liquid tank, whereby electrophoresis was started with a constant current control of 70 μA.

6) The absorbance at 415 nm was measured by a detector to obtain an electropherogram. Electrophoresis was performed for 40 seconds.

Figure 4A:
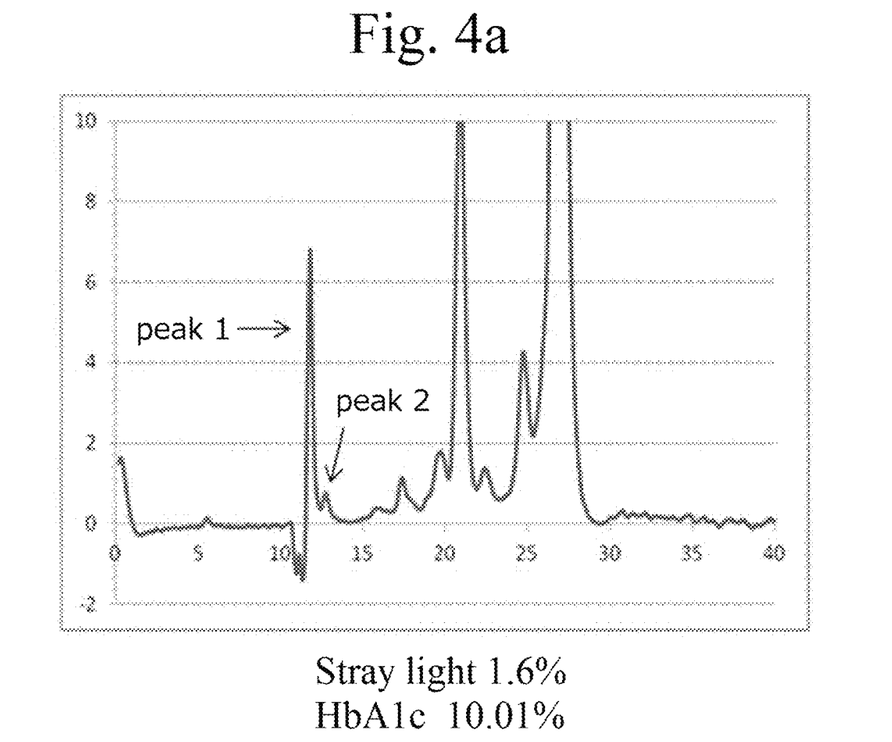
FIG. 4a to FIG. 4d are graphs showing results of electrophoresis using a microchip.
Figure 4B:
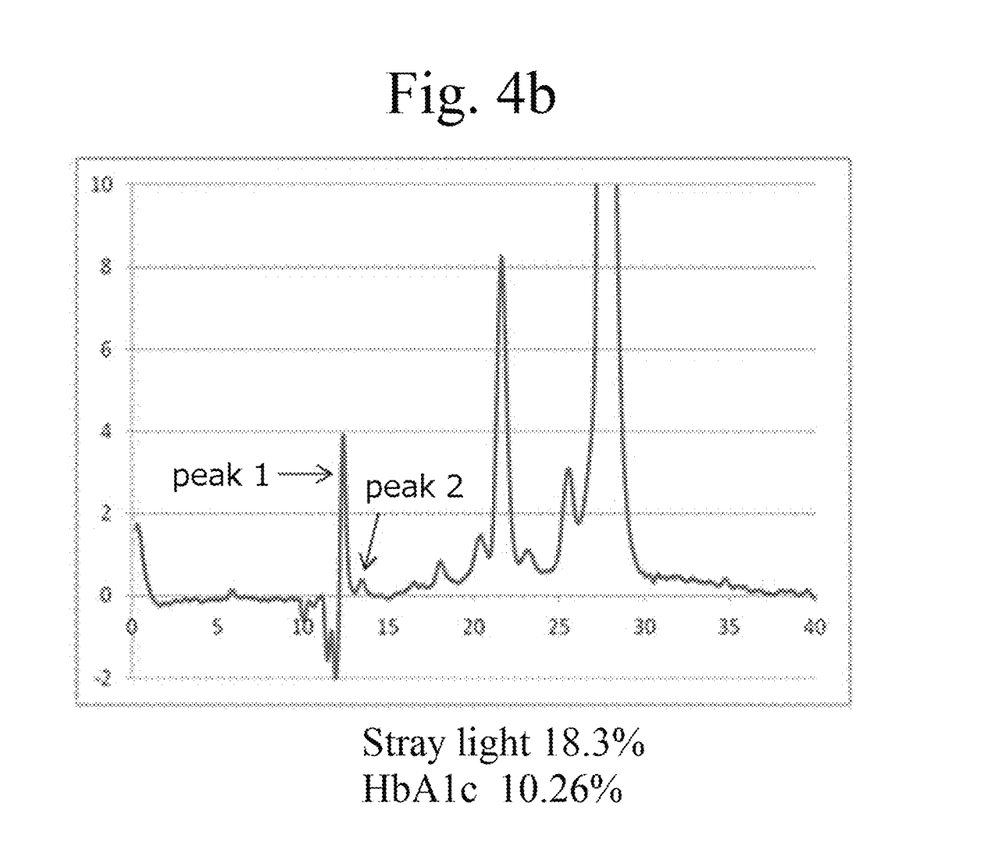
Figure 4C:
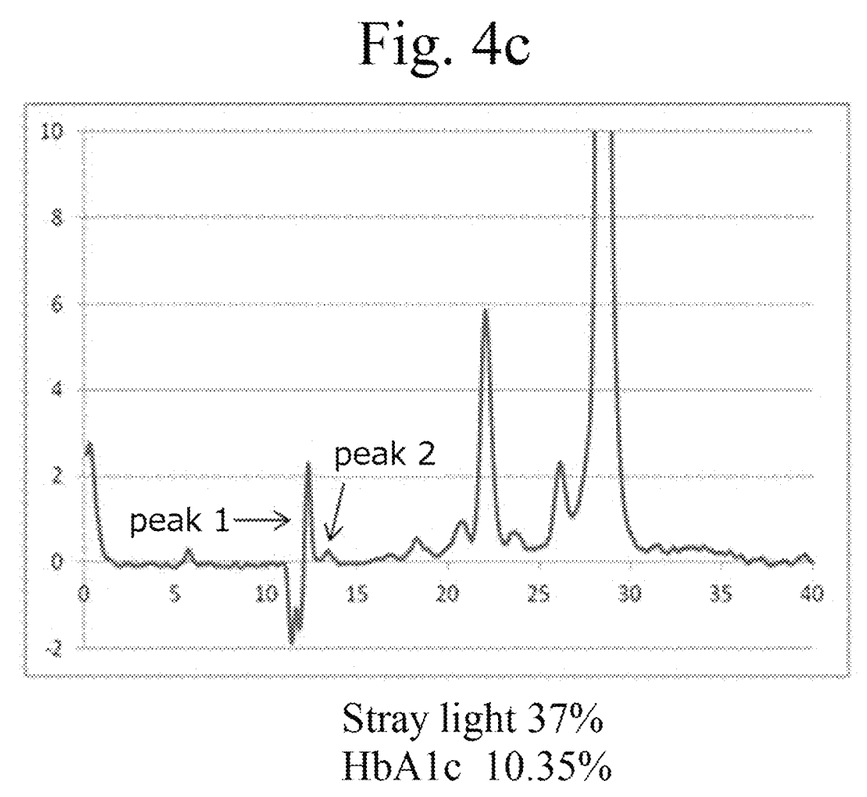
Figure 4D:
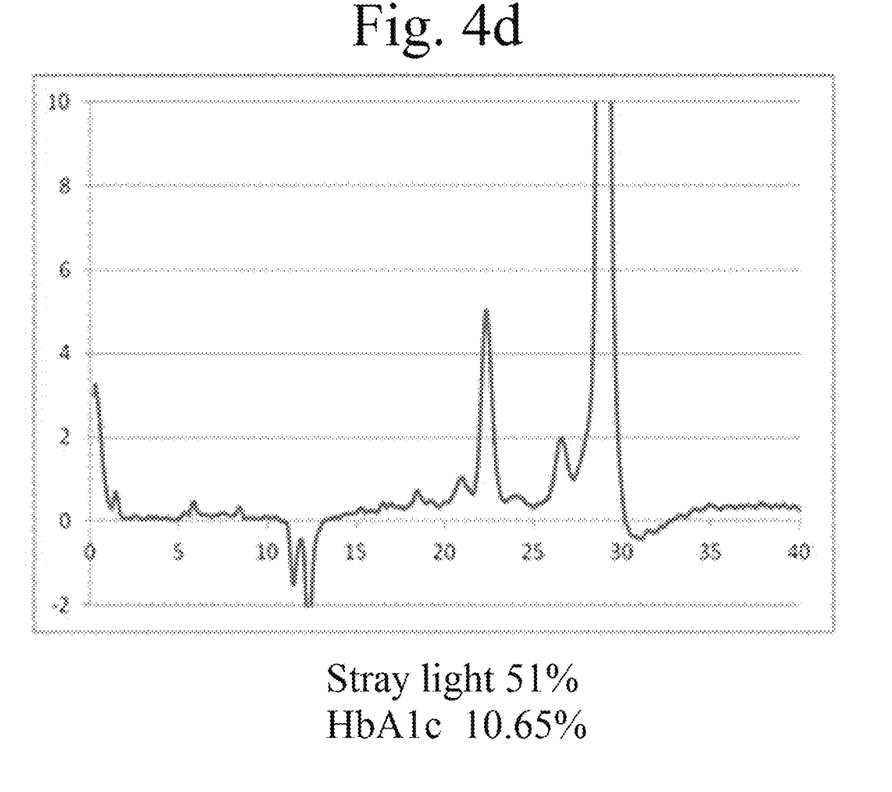

The results of the capillary electrophoresis are as shown in FIG. 4a to FIG. 4d. In FIG. 4a to FIG. 4c, Peak 1 and Peak 2 represent the change in absorbance caused by the component difference between the electrophoresis liquid (1) and the electrophoresis liquid (2), and more specifically, Peak 1 is the absorbance change amount derived from NDSB-201, and Peak 2 is the absorbance change amount derived from EMULGEN LS-110.
<Stray Light Ratio Measurement>
According to the following procedure, the stray light ratio of the microchip (stray light ratio of the detector) was measured. The stray light ratio was measured using the four microchips after conducting the capillary electrophoresis described above.

1) A microchip was set in a dedicated device manufactured by ARKRAY, Inc.

2) The absorbance at 415 nm was measured at the detector (Signal).

3) A light shielding liquid was added to the electrophoresis liquid tank (electrophoresis liquid reservoir) of the microchip, and the light shielding liquid was filled in the capillary flow path by pressurization.

4) The absorbance at 415 nm was measured at the detector (Background).

5) The stray light ratio was calculated by "(Signal/Background)×100".

<Optical Quality Determination>

Based on the electropherogram information shown in FIG. 4a to FIG. 4d, the top values of Peak 1 and Peak 2 and HbA1c measured values (NGSP %) were obtained. These values are shown in Table 1 together with the stray light ratio determined by the stray light ratio measurement described above.

TABLE 1

| Microchip | Stray light ratio (%) | HbA1c (NGSP %) | Peak 1 Top value | Peak 2 Top value |
|---|---|---|---|---|
| 1 | 2 | 10.01 | 6.5 | 0.69 |
| 2 | 18 | 10.26 | 3.9 | 0.39 |
| 3 | 37 | 10.35 | 2.3 | 0.26 |
| 4 | 51 | 10.65 | 0.0 | 0.00 |

As shown in Table 1, there was a tendency that the HbA1c measured value tended to increase as the stray light ratio was larger, and the top values of Peak 1 and Peak 2 tended to decrease. Therefore, for example, with respect to top value of at least one of Peak 1 and Peak 2, a threshold value is predetermined and compared with Peak top value obtained by conducting capillary electrophoresis, and when the value obtained by the conduct is equal to or more than the threshold value, it may be determined that the state of optical detection is favorable, and when the value obtained by the conduct is less than the threshold value, it may be determined that the state of optical detection is poor. The threshold value may be appropriately determined according to an allowable stray light ratio, an allowable deviation of HbA1c measurement value, and the like. Even when an optical measurement value of another index such as a value of the transmitted light intensity per se is used, determination can be done by setting a threshold value in the same way.

DESCRIPTION OF SYMBOLS

1, 11 Sample reservoir, 2 Capillary flow path, 3 Electrophoresis liquid reservoir, 4 Detector, 5 Mixing tank, 6 Anode, 7 Cathode, 10 Control unit, 12 Arrangement unit, 13 Photodiode (Measurement unit), 14 LED chip (light emitting unit), 15 Optical filter, 16 Lens, 17 Slit, 100, 200 Microchip, 300 Analysis system

What is claimed is:

1. A determination method for determining the state of optical detection of analytes in a sample in a capillary flow path on a chip in which electrophoresis is conducted, comprising:

filling the capillary flow path with an electrophoresis liquid including a known amount of a specific substance other than the analytes, thereby forming a capillary flow path filled with the electrophoresis liquid;

an introducing process introducing the sample to the capillary flow path filled with the electrophoresis liquid;

a detection process optically detecting a value of the specific substance in the capillary flow path and detecting a value of the analytes in the capillary flow path; and a determination process comparing the value of the specific substance, other than the value of the analytes, with a predetermined value according to the known amount of the specific substance whereby determining the state of optical detection of analytes.

2. The determination method according to claim 1, wherein the specific substance is an electrically neutral substance.

3. The determination method according to claim 1, wherein the specific substance is at least one of 1-(3-sulfopropyl) pyridinium hydroxide inner salt or polyoxyalkylene alkyl ether.

4. The determination method according to claim 1, wherein the value of the specific substance is an absorbance or an absorbance change amount derived from the specific substance.

5. The determination method according to claim 4,
   wherein if the absorbance or the absorbance change amount is equal to or larger than an allowable stray light ratio, it is determined that the state of the optical detection is favorable, and
   wherein if the absorbance or the absorbance change amount is less than the allowable stray light ratio, it is determined that the state of the optical detection is poor.

6. The determination method according to claim 1, wherein the analyte is a biologically derived substance.

7. The determination method according to claim 1, wherein the value of the specific substance is detected to be less than the predetermined value, a correction of the value of the analytes is performed.

8. The determination method according to claim 7, wherein if the state of the optical detection is detected to be poor, the value of the analytes is corrected according to the absorbance or the absorbance change amount.

* * * * *